Figure 1:
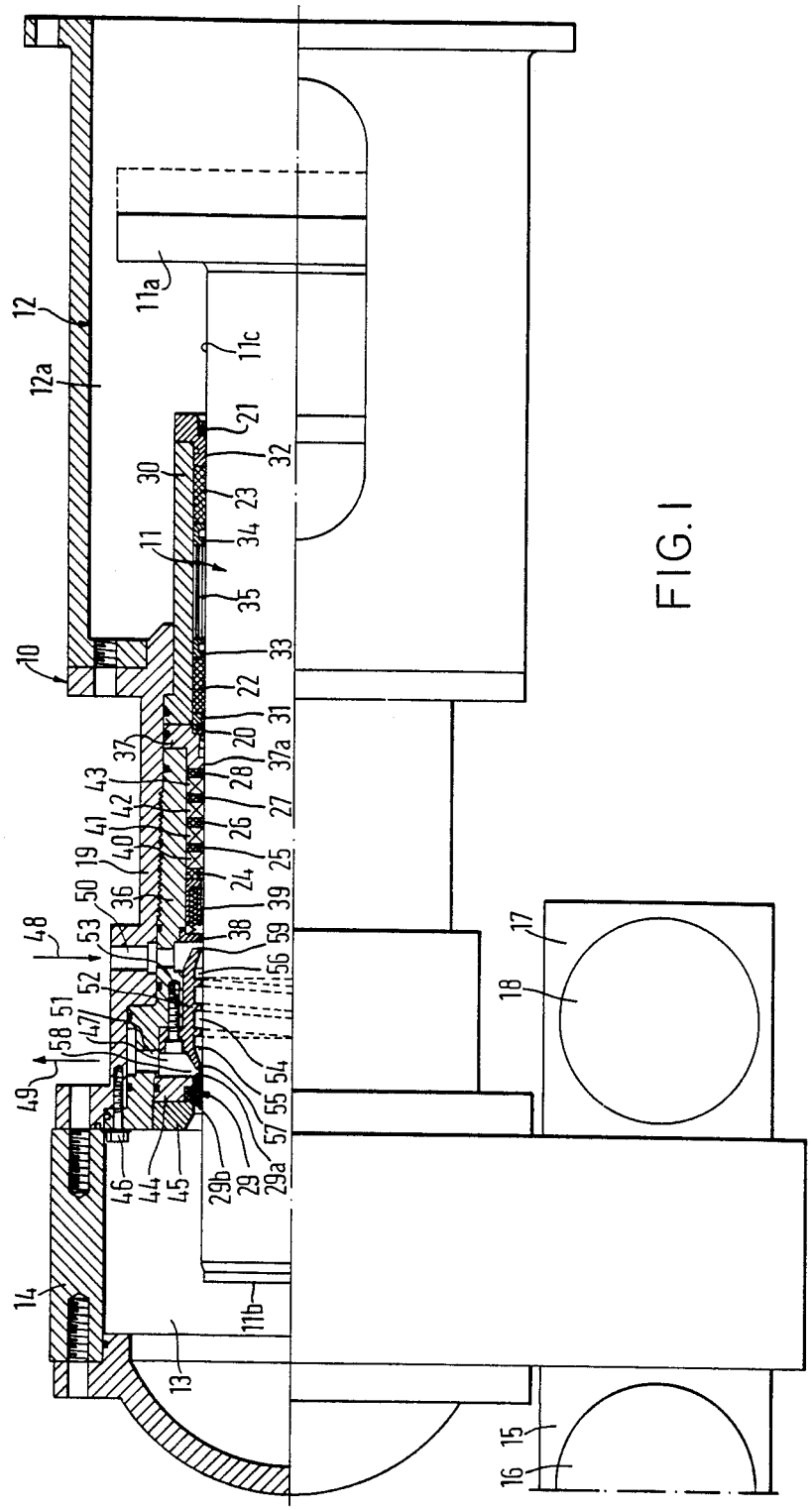

United States Patent [19]

Loland

[11] Patent Number: 4,833,976
[45] Date of Patent: May 30, 1989

[54] SEALING MEANS FOR A HIGH PRESSURE AXIAL PISTON PUMP

[75] Inventor: Magnus Loland, Leirvik i Sogn, Norway

[73] Assignee: Kleven Loland A/s, Sogn, Norway

[21] Appl. No.: 717,227

[22] Filed: Mar. 25, 1985

Related U.S. Application Data

[63] Continuation of Ser. No. 84/00029, Jul. 18, 1984.

[30] Foreign Application Priority Data

Jul. 25, 1983 [NO] Norway .................. 832693

[51] Int. Cl.$^4$ .............................................. F01S 31/00
[52] U.S. Cl. ........................................ 92/86.5; 92/87; 277/203; 277/53; 277/24; 277/71; 277/59
[58] Field of Search ............... 92/165, 168, 82, 56.5, 92/174, 141, 142, 87; 277/59, 153, 154, 152, 134, 203, 53, 15, 3, 71, 79

[56] References Cited

U.S. PATENT DOCUMENTS

| | | | |
|---|---|---|---|
| 3,625,523 | 12/1971 | Gardner | 277/59 |
| 3,847,453 | 11/1974 | Herbert | 277/59 |
| 3,922,115 | 11/1975 | Coe et al. | 92/87 |
| 3,943,717 | 3/1976 | Schexnayder | 277/59 |
| 4,305,592 | 12/1981 | Peterson | 277/59 |
| 4,413,829 | 11/1953 | Pietsch | 277/59 |

FOREIGN PATENT DOCUMENTS

| | | | |
|---|---|---|---|
| 522655 | 3/1931 | Fed. Rep. of Germany | 277/59 |
| 2911000 | 2/1980 | Fed. Rep. of Germany | 277/59 |
| 877892 | 9/1958 | United Kingdom | 277/203 |
| 1206664 | 4/1968 | United Kingdom | 277/59 |

Primary Examiner—Robert E. Garrett
Assistant Examiner—Thomas Denion
Attorney, Agent, or Firm—Kenyon & Kenyon

[57] ABSTRACT

The axial piston pump is provided with two annular seals mounted in the housing and sealingly engaging the piston to define a sealing fluid zone therebetween. An annular ring is provided between the seals to control the flow of sealing fluid through the fluid zone. This ring includes an internal helical flush duct for guiding the sealing fluid helically about the piston from one end of the ring to the other end of the ring.

9 Claims, 2 Drawing Sheets

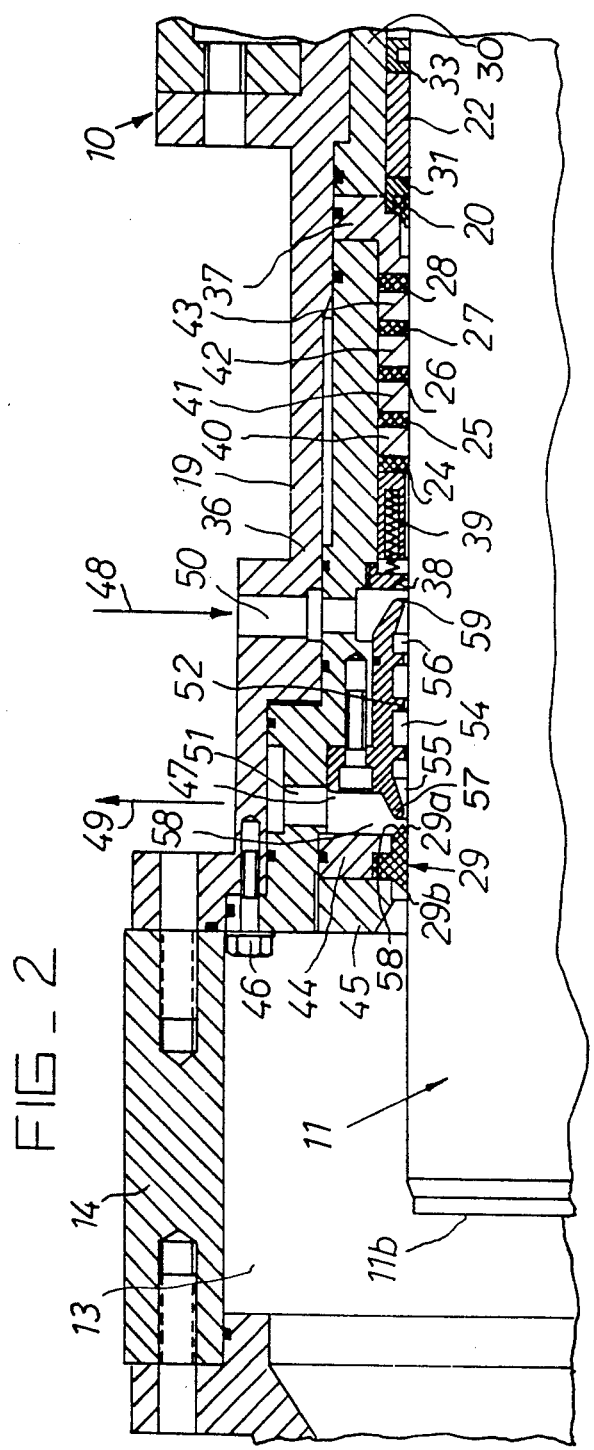
FIG_2

SEALING MEANS FOR A HIGH PRESSURE AXIAL PISTON PUMP

This is a continuation of International Application PCT/NO84/00029 filed 7/18/84.

The present invention relates to a sealing means for a high pressure axial piston pump, especially for use as a drill slime pump, where the piston of the pump is surrounded by a first gasket which faces the side of the pump medium and a second gasket which faces the drive side and an intermediate sealing fluid zone having circulating high pressure sealing fluid.

The present invention is especially of interest in connection with pumps for pumping drill slime, where the drill slime is to be pumped at a relatively high pressure. By virtue of high pump pressures used and the special consistency of the pump medium (the drill slime), the pump is exposed to heavy wear at the gasket arrangements between the pump medium and the drive medium and is consequently exposed to an increasing admixture of pump medium in drive medium, and vice versa, gradually as the wear develops. There is especially a tendency for the formation of a coating of drill slime particles on the piston and gaskets. Some of the coating can be scraped off or removed by the gasket itself as a consequence of the axial movement of the piston relative to the gaskets, but it is difficult to avoid wear on the piston and gaskets.

With the sealing fluid there is the possibility of effecting cooling of the piston and blocking the unintentional flow of pump medium towards the drive side and the unintentional flow of medium from the drive side towards the pump medium side. This can generally be achieved by employing a relatively high pressure on the cooling and sealing fluid. For example, sealing fluid can be employed at so high a pressure that on leakage there is only a flow of sealing fluid towards the drive side and towards the pump medium side respectively, while leakage is prevented the opposite way inwardly into the sealing fluid. However, all according to the conditions, the pressure of the sealing fluid can be regulated as required.

As a consequence of the rapid axial movement of the pump piston relative to the gaskets and despite the high pressure of the sealing fluid there is, however, a danger of a film of pump medium or a film of lubricating agent or the like being carried inwards between the gaskets and possibly further inwards into the sealing fluid zone. By means of the circulating sealing fluid one can get to a certain degree an emptying out together with the sealing fluid of possible pump medium content and content of lubricating agent and the like.

In practice, however, problems are presented in getting rid of the film of pump medium (with associated slime particles) and of the lubricating medium to a degree sufficient to be able to avoid coating formations on the piston pump and on adjacent gaskets. Consequently, it is difficult to reduce the wear on the piston pump or on the gaskets.

With the present invention the aim is to reduce or prevent coating formations on the pump piston and on the gaskets and to provide for an especially effective removal of portions of pump medium and other ingressed medium which might have leaked inwardly into the sealing fluid zone.

Briefly, the invention provides a piston pump having a housing, a piston slidably mounted in the housing and a pair of annular gasket systems disposed in sealing relation between the housing and the piston with an annular control means in an intermediate sealing fluid zone between the gasket systems for controlling a flow of sealing fluid through the zone. This annular control means includes an inlet opening facing one of the gasket systems to receive a flow of sealing fluid, an internal helical flush duct for guiding the sealing fluid helically about the piston and an outlet opening facing the other of the gasket systems to discharge the flow of sealing fluid towards this gasket system.

By arranging a special flush chamber with associated helical flush duct within the sealing fluid zone, there is the possibility of achieving an especially effective cooling of the piston and of getting rid in an especially controlled and accurately localised manner of possible coatings from the adjoining surface portions of the piston with a concentrated flush effect which can effectively carry along and remove significant amounts of pump medium or other ingressed medium.

By respectively arranging the inlet opening and the outlet opening of the flush duct just in front and just behind the associated gasket, there is the possibility of utilising the whole zone between the gaskets as an effective flush region.

By providing for movement of the flush fluid in an axial direction from the drive side towards the pump medium side, there is a real possibility of counteracting the ingress of pump medium (with associated particles) in the region of the flush duct. This pattern of movement of the flush fluid is especially advantageous due to the fact that the piston, during displacement of the pump medium in the displacement chamber of the pump and during a corresponding rise in pressure in the displacement chamber, moves co-currently with the flush fluid, with a minimal possibility for the pump medium to be introduced into the flush fluid chamber. When the piston moves in the opposite direction, that is to say counter-currently to the flush fluid, the pump medium is subjected to a corresponding pressure drop, so that there is then obtained an effective back pressure from the flush fluid towards the pressure medium side.

It is preferred that a relatively narrow annular flush fluid gap is defined between the outlet opening of the flush duct and the first gasket, the outlet opening of the flush duct defining towards the piston an annular gap which opens outwards in the form of a nozzle into the narrow annular flush fluid gap.

By defining an annular flush fluid chamber between the outlet opening of the flush duct and the first gasket, there is the possibility of obtaining an especially effective flushing off of the section in front of the flush duct with an especially rapid emptying of flush fluid from the flush duct in the section and with an especially rapid removal of flush fluid radially outwards from this section.

By providing an annular gap which opens outwards nozzle-like into the annular flush fluid chamber from the outlet opening of the flush duct there is the possibility of effecting the flushing away and removal of the flush fluid in a composite axial and outwardly extending radial movement to the subsequent annular fluid discharge chamber. This last-mentioned movement, together with the transverse movement of the flush fluid in the flush duct gives an especially effective flushing of the piston in a composite pattern of movement. In the flush duct itself there is thus obtained a flushing across the axial path of movement of the piston, while thereafter there is obtained at the outlet of the flush duct an emptying of flush fluid and carried along portions of ingressed medium in a controlled manner in an axial direction along the piston and outwardly into the fluid discharge chamber radially outwards from the piston.

It is also preferred that there is defined an outer annular flush fluid gap between the inlet opening of the flush duct and the second gasket, the inlet opening of the flush duct defining with the piston an inner annular gap which opens outwards in the form of a nozzle into the flush duct. In this way there is obtained a nozzle-like effect towards the adjacent outer surface of the piston at the intake opening of the flush duct also, that is to say an extra substantially axially directed nozzle-like effect in addition to the substantially axially directed nozzle-like effect which is obtained at the outlet opening of the flush duct. In this way there can be obtained a two stage axially directed nozzle-like flush effect in addition to the intermediate helical flush effect, that is to say a flushing based on three successive mutually angled patterns of movement for the flush fluid.

It is preferred that the flush duct extends helically over two or more helical turns and has over at least one screw turn a duct cross-sectional area corresponding substantially to the gap cross-sectional area of the outlet opening and/or the inlet opening, a portion of the helical duct just in front of the outlet opening and/or a portion of the helical duct just behind the inlet opening having a somewhat larger cross-sectional area than the gap cross-sectional area of the outlet opening or the inlet opening. In this way there is obtained, without an especially marked loss of pressure, a relatively large rate of flow for the flush fluid in the flush duct itself as well as in the outlet opening and/or the inlet opening of the flush duct and with an effective utilisation of the variable path of movement of the flush fluid in the flush fluid zone.

Further features of the invention will be evident from the following description with reference to the accompanying drawing, wherein FIG. 1 illustrates a part cross sectional view of a pump employing a sealing means according to the invention; and FIG. 2 illustrates an enlarged cross sectional view of the pump.

Referring to FIGS. 1 and 2, there is shown an axial piston pump 10. The pump has a cylindrical piston 11 which is an extension of the hydraulic drive unit, that is to say the piston 11 has a radially expanded coupling flange 11a in a pressure discharge chamber 12a which pushes up against a hydraulic drive cylinder (not shown), at one end of the piston 11, and a working piston surface 11b in the working or displacement chamber 13 of the pump at the opposite end of the piston. In the pump housing 14 which surrounds the displacement chamber 13 there is mounted on a pump medium inlet 15 with associated inlet valve 16 and a pump medium outlet 17 with associated outlet valve 18. Between the pump housing 14 and a housing 12 which includes the pressure discharge chamber 12a there is arranged a bearing housing 19 which includes a series of different gaskets 20–29 which form seals against the cylindrical surface 11c of the piston 11 at various locations axially along the piston 11.

There is illustrated in connection with the chamber 12a a first gasket system 20–23 with four sealing rings 20, 21, 22 and 23 fixed to a support sleeve 30. The gasket system includes two opposite, outer lip ring gaskets 20 and 21 fixed to respective holders 31 and 32 together with two slide ring gaskets 22 and 23 which are located between a respective one of the holders 31, 32 and a respective control member 33 and 34. Between the control members 33, 34 there is a chamber 35 with slide bearings which are supplied with lubricating agent in a manner not shown further.

A second gasket system 24–28 having five ring seals 24, 25, 26, 27 and 28 are fastened in between two separate support members 36 and 37 and a holder member 38 having an axially spring-loaded stop 39. The series of ring seals 24–28 are mutually separated by intermediate space rings 40–43 and are held clamped together between a stop portion 37a on the support member 37 and the spring-loaded stop 39.

A lip seal 29 having oppositely directed lips 29a and 29b is fixed to a support member 44 connected to the support member 36 and is held in place on the latter by means of a clamp member 45 which with internal threads can be screwed tight to internal threads on the support member 36. The support member 36 is fixed to the housing 12 with fastening screws 46 (only one is shown in the drawing).

Between the lip seal 29 and the gasket system 24–28 there is cut out a sealing fluid chamber 47, that is to say there is formed a sealing fluid zone along a specific section of the piston 11. By an arrow 48 the supply of sealing fluid is indicated and by an arrow 49 there is indicated the discharge of used, possibly contaminated sealing fluid. The sealing fluid can be supplied at an arbitrary pressure and in arbitrary large quantities. There is shown a sealing fluid inlet 50 to the chamber 47 and a sealing fluid outlet 51 from the chamber 47.

In the chamber 47 there is mounted a control means 52 in the form of an annular ring which ensures a flushing of sealing fluid along the connecting surface of the piston 11. The control means is fixed with screws 53 (only one is shown in the drawing) to the support member 36. The control means 52 is provided internally with a helical groove which together with the connecting surface of the piston 11 forms a helical duct 54 having a length of for example 2-3 turns. The helical groove borders at the ends of the control means 52 on annular ducts 55 and 56. As shown to the left of the control means 52 in the drawing the duct 55 has a somewhat larger breadth and larger cross-sectional area than the duct 54 and converges inwardly towards the piston 11 reckoned in the axial direction of the piston. Between the outer surface of the piston 11 and the outer edge 57 of the control means 52 there is formed a narrow annular gap which defines a nozzle shaped outlet opening having a cross-sectional area which corresponds substantially to the cross-sectional area of the duct 54. By means of the converging cross-section of the duct 55 there is achieved a marked guide effect of flush fluid from the duct 55 in an axial direction along the piston with a nozzle-like flush effect. Immediately outside the outer edge 57 of the control means 52 there is formed a narrow gap 58 with the inwardly directed lip 29a of the lip seal 29. The flush effect is especially effective in the narrow gap 58 before the fluid is emptied out in the discharge in the sealing fluid chamber 47. The flush effect has for its objective to press the lip 29a against the piston 11 with a certain force at the same time as the lip 29a ensures that the flush fluid with any particles carried along from the lubricating agent or pump medium is effectively emptied out into the chamber 47 at a distance from the piston 11.

In order to achieve an effective flush effect it is considered of great significance that the flushing substantially across the piston, produced by means of the flow of fluid through the helical duct 54, is followed by a flow axially along the piston in the gap 58 comprising the nozzle-like flush effect in the duct 55.

A further increased flush effect is obtained at the opposite end of the control means 52 in that the duct 56 has a substantially opposite path to the duct 55. The associated other outer edge 59 of the control means 52 defines a narrow gap which forms an inlet opening with the adjacent surface of the piston and the cross-sectional area of this gap corresponds substantially to the cross-sectional area of the duct 54. From this gap the duct 56 expands, that is to say it diverges in the axial direction of the piston towards the duct 54. By means of the narrow gap and the adjacent axially diverging duct 56 there is obtained an effective nozzle-like flush effect at the inlet to the control means 52 also, that is to say with a flow in the axial direction of the piston. In other words there is obtained at opposite ends of the control means a two step nozzle-like flush effect in the axial direction of the piston and an intermediate helical flush effect in a direction across the axial direction of the piston.

In practice it is ensured that the fluid pressure of the sealing fluid or the flush fluid at the outlet from the control means corresponds to or exceeds the maximum pressure of the pump medium. Alternatively, a somewhat lower fluid pressure can be utilised for the sealing fluid or the flush fluid, but in such instances a great rate of flow of the sealing fluid or the flush fluid is preferred.

I claim:

1. In combination
   a housing;
   a piston slidably mounted in said housing;
   a pair of annular gasket systems disposed in sealing relation between said housing and said piston and defining an intermediate sealing fluid zone therebetween; and
   annular control means in said sealing fluid zone for controlling a flow of sealing fluid through said zone, said control means having an inlet opening facing one of said gasket systems to receive a flow of sealing fluid, an internal helical flush duct for guiding the sealing fluid helically about said piston, and an outlet opening facing the other of said gasket systems to discharge the flow of sealing fluid towards said other gasket system.

2. The combination as set forth in claim 1 wherein said outlet opening is nozzle-shaped.

3. The combination as set forth in claim 1 wherein said other gasket system includes an annular seal having a lip sealingly engaging said piston and facing said outlet opening whereby a discharge of sealing fluid presses said lip against said piston.

4. The combination as set forth in claim 1 wherein said inlet opening is nozzle-shaped.

5. The combination as set forth in claim 4 wherein said control means is spaced from said one gasket system to define an annular gap therebetween and is spaced from said other gasket system to define an annular gap therebetween.

6. In an axial piston pump, the combination comprising
   a high pressure axial pump housing;
   a piston reciprocally mounted in said housing;
   at least two annular seals mounted in said housing and sealingly engaging said piston to define a sealing fluid zone therebetween; and
   annular control means in said sealing fluid zone for controlling a flow of sealing fluid through said zone, said control means having an inlet opening facing one of said seals to receive a flow of sealing fluid, an internal helical flush duct for guiding the sealing fluid helically about said piston, and an outlet opening facing the other of said seals to discharge the flow of sealing fluid towards said other seal.

7. The combination as set forth in claim 6 wherein said other seal has a lip sealingly engaging said piston and facing said outlet opening whereby a discharge of sealing fluid presses said lip against said piston.

8. The combination as set forth in claim 7 wherein said control means is spaced from said one seal to define an annular gap therebetween and is spaced from said other seal to define an annular gap therebetween.

9. The combination as set forth in claim 6 wherein said control means includes an internal helical groove to define a helical duct for a flow of sealing fluid; a first annular duct on one side of said helical groove defining an inlet to said groove of increasing cross-sectional shape; and a second annular duct on an opposite side of said helical groove defining an outlet from said groove of decreasing cross-sectional shape.

* * * * *